(12) United States Patent
Walter et al.

(10) Patent No.: US 7,316,440 B2
(45) Date of Patent: Jan. 8, 2008

(54) PROTECTIVE DEVICE FOR A LUGGAGE AREA OF A MOTOR VEHICLE

(75) Inventors: Herbert Walter, Ebersbach (DE); Werner P. Schlecht, Vaihingen/Enz (DE); Henning Sparrer, Weilheim (DE); Marina Ehrenberger, Esslingen (DE); Thomas Seeg, Ostfildern (DE)

(73) Assignee: BOS GmbH & Co KG, Ostfildern (DE)

( * ) Notice: Subject to any disclaimer, the term of this patent is extended or adjusted under 35 U.S.C. 154(b) by 0 days.

(21) Appl. No.: 11/583,309

(22) Filed: Oct. 19, 2006

(65) Prior Publication Data

US 2007/0035145 A1 Feb. 15, 2007

Related U.S. Application Data

(62) Division of application No. 10/964,491, filed on Oct. 13, 2004, now Pat. No. 7,140,659.

(30) Foreign Application Priority Data

Oct. 15, 2003 (DE) .............................. 103 48 892.8

(51) Int. Cl.
*B60R 11/00* (2006.01)
(52) U.S. Cl. .................. 296/37.16; 296/98; 296/24.43; 160/370.22
(58) Field of Classification Search ............ 296/37.16, 296/98, 24.43; 160/370.22
See application file for complete search history.

(56) References Cited

U.S. PATENT DOCUMENTS

| 3,889,970 | A | 6/1975 | Astheimer et al. |
| 6,155,621 | A | 12/2000 | Nishida et al. |
| 6,349,986 | B1 | 2/2002 | Seel et al. |
| 6,390,526 | B1 | 5/2002 | Ament et al. |
| 6,402,217 | B1 | 6/2002 | Ament et al. |
| 6,416,103 | B1 | 7/2002 | Laudenbach et al. |

FOREIGN PATENT DOCUMENTS

| DE | 41 23 655 A1 | 1/1993 |
| DE | 197 22 501 A1 | 12/1997 |
| DE | 198 33 571 C1 | 12/1999 |
| DE | 199 09 142 C1 | 5/2000 |
| EP | 0 943 498 A1 | 9/1999 |
| EP | 0 976 615 A2 | 2/2000 |
| JP | 1-204836 | 8/1989 |
| JP | 1-204837 | 8/1989 |
| JP | 5-44381 | 2/1993 |

OTHER PUBLICATIONS

German Patent Office Action dated Apr. 29, 2005 (2 pages).
European Patent Office Search Report dated Jan. 7, 2005 (3 pages).

*Primary Examiner*—Joseph D. Pape
(74) *Attorney, Agent, or Firm*—Flynn, Thiel, Boutell & Tanis, P.C.

(57) ABSTRACT

A protective device for a motor vehicle luggage area has a flexible flat article, which is movably mounted between a compact, deposited protection position and at least one extracted protection position. There are at least two parallel, spaced functional shafts to which the flat article is connected. The position of the flat article is detected and a controller, as a function of the detected position, controls the functional shafts in such a way that the flat article in a first, roughly horizontally extracted protection position has a first, light-proof surface structural portion and in a second, vertically extracted protection position a second, light-transmitting surface structural portion.

2 Claims, 6 Drawing Sheets

PROTECTIVE DEVICE FOR A LUGGAGE AREA OF A MOTOR VEHICLE

CROSS-REFERENCE TO RELATED APPLICATIONS

This application is a divisional application of U.S. Pat. application Ser. No. 10/964,491, filed Oct. 13, 2004, now U.S. Pat. No. 7,140,659.

The following disclosure is based on German Patent Application No. 10348892.8 filed on Oct. 15, 2003, which is herewith incorporated into this application by explicit reference.

FIELD OF THE INVENTION

The invention relates to a protective device for a luggage area of a motor vehicle with at least one flexible flat article, which is movably mounted between a compact, deposited rest position and at least one extracted protection position.

DESCRIPTION OF RELATED ART

Such a protective device in the form of a luggage area cover is known from DE 199 44 948 C1. The known luggage area cover has a flexible flat article, which is held in a magazine casing in such a way that it can be wound onto and from a winding shaft. The magazine casing is positioned in the vicinity of a rear seat back arrangement. In a front end area in the extraction direction is provided a dimensionally stable extraction ledge extending over the width of the flat article and whose lateral ends project beyond the lateral edges of the flat article. The lateral ends of the extraction ledge are positioned in lateral guide rails of the luggage area in which there are longitudinal displaceable drivers or dogs, which drive the lateral ends of the extraction ledge with limited force along the guide rails. The drivers are driven by an electrical drive mechanism, the facing drivers preferably being synchronized with one another in order to bring about a parallel extraction or insertion movement of the extraction ledge and consequently the flat article. Thus, the flat article is movably mounted between a compact, wound-up rest position integrated in the magazine casing and a protection position roughly horizontally covering a vehicle luggage area.

Other known protective devices for luggage areas of station wagons have two flat articles, which are in each case mounted on an individual winding shaft so that they can be drawn in and out. One flat article is extractable roughly horizontally and serves as the luggage area cover. The other flat article is roughly vertically extractable and serves as a separating device between the luggage area and a passenger compartment of the station wagon. The flat article of the separating device is designed in light-transmitting manner through its construction as a separating net. The flat article functioning as the luggage area cover is view-tight and therefore substantially in light-proof manner so that, in the extracted protection position of the luggage area cover, it is not possible to view the luggage area content from outside the vehicle.

The problem of the invention is to provide a protective device for a motor vehicle luggage area through which, with simple means, it is possible to implement different protection states for the vehicle luggage area.

SUMMARY OF THE INVENTION

According to the invention this problem is solved by a protective device for a vehicle luggage area having the features of the independent claims.

Advantageous further developments of the invention are given in the dependent claims.

The invention is based on the idea of detecting positions of a flat article using position detecting means and as a function of detected flat article positions to so control spaced functional devices with which the flat article is connected that said article in a first, roughly horizontally extracted protection position has a first, less light-transmitting surface structural portion and a second, roughly vertically extracted protection position has a second, more light-transmitting surface structural portion. It is possible to transfer the flat article into one of the two protection positions.

As a result of the solution according to the invention the flat article serves both as a roughly horizontally fixed luggage area cover and as a roughly vertically fixed separating device between a passenger compartment and the luggage area. In the roughly horizontal protection position the flat article is preferably extracted or drawn out roughly to the level or just below the level of a vehicle edge and covers the luggage area. As a result of an at least partly light-proof and therefore view-tight surface structure of the flat article in this tide in this position there is a sight or viewing protection for luggage positioned below the flat article. Whilst functioning as a separating device, the flat article with the more light-transmitting and consequently preferably at least substantially transparent surface structure is drawn out roughly vertically up to the roof lining. As a result of the light-transmitting surface structure the view of the vehicle driver, particularly through the rear-view mirror, is virtually unimpeded.

According to the invention, the position detection means detect the particular position and/or displacement movement of the flat article within the luggage area. Using the control means the detected position is evaluated and the at least two functional devices are controlled as a function of the detected position. There is preferably a mechanical detection of the flat article position and the control of the functional devices. It is also possible to have an electrical and/or electronic, pneumatic, hydraulic or some other detection, coupling and control. A corresponding solution can also involve combinations of these modes.

Advantageously the first, view-tight surface structural portion of the flat article is operatively connected to a first functional shaft and the second, transparent surface structural portion is operatively connected to a second functional shaft. As a function of a detected, first position, preferably an extraction movement is released for the first surface structural portion of the flat article and a movement of the second surface structural portion of the flat article is blocked. As a function of a detected, second position, a drawing in movement for the first surface structural portion and a drawing out movement for the second surface structural portion is released. As a function of a detected, third position a drawing out movement for the first surface structural portion and a drawing in movement for the second surface structural portion is released. Advantageously the first position corresponds to the compact, deposited protection position, the second position to the first, roughly horizontally extracted protection position and the third position to the second, roughly vertically extracted protection position.

According to a development of the invention, the functional devices are constituted by functional shafts on which the flat article is held so that it can be wound on and off. Preferably, with said functional shafts are associated drive means, which act on the given surface structural portion, at least in the winding up direction. The drive means can be constituted by a mechanical spring means, such as in particular a return spring.

According to a further development of the invention the position detection means are constructed as electrical and/or electronic sensors, which are evaluated by an electronic control unit which, as a function of the detected position, controls the functional shafts by means of corresponding actuators.

According to another development of the invention the activation of the functional shafts, in addition to the detected position, is dependent on the direction of the following movement performed. Thus, e.g. in the detected, second position and a following movement in the direction of the first position, the second functional shaft is blocked and with a following movement in the direction of the third position the second functional shaft is released for an extraction movement.

On reaching the third position both functional shafts can be blocked and with a following movement in the direction of the second position the first functional shaft is released for a drawing out movement and the second functional shaft for a drawing in movement.

The problem of the invention is also solved in that a protective device for a luggage area of a motor vehicle with a flexible flat article movably mounted between a compact, deposited rest position and at least one extracted protective position is provided with at least two surface structural portions connecting onto one another in the extraction direction and having a differing light transmission and which form part of the flat article, a front end region of the flat article at the rear in the extraction direction is fixed to a vehicle-fixed, mounted winding shaft, the flat article being reversed on a guide profile movably mounted parallel to the winding shaft in the luggage area and a front end area of the flat article at the front in the extraction direction is fixed to a vehicle-fixed component adjacent to the winding shaft. This solution makes it possible in simple manner by means of an uncomplicated winding on and off movement of the winding shaft and with a simultaneous spatial displacement of the guide profile, to bring the different surface structural portions of the flat article into their working or protection position. The flat article preferably loops round the guide profile over approximately 180.o slashed. of its circumference and can either be rotatable about its longitudinal axis or fixed. In the former case a tensile load acting on the flat article exerts a rolling movement on the guide profile. In the latter case the flat article slides over the outer jacket of the guide profile.

In a development of the invention the lengths of the surface structural portions are matched to the corresponding spatial extensions of the luggage area sections to be covered. This ensures that for a roughly horizontal protection position the surface structural portion with reduced light transmission forms a view-tight luggage area cover and that in the roughly vertical protection position the at least one surface structural portion with increased light transmission makes it possible to view the motor vehicle tail from the passenger compartment.

Further advantages and features of the invention can be gathered from the attached claims and the following description of preferred embodiments of the invention illustrated by the drawings. The wording of the claims is hereby expressly made into part of the subject matter of the present description.

DETAILED DESCRIPTION OF THE INVENTION

Figure 1:
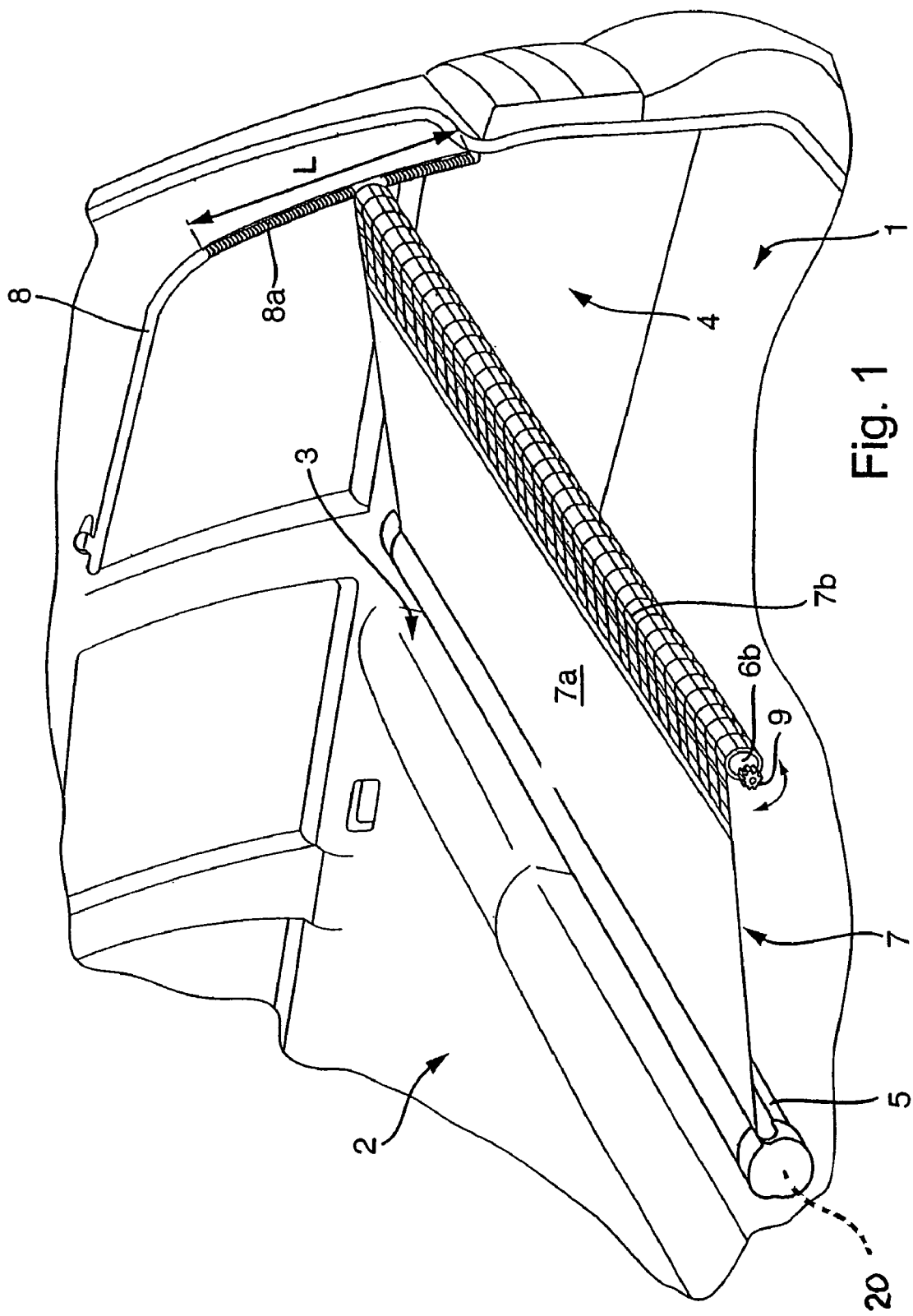
FIG. 1 perspectively shows a luggage area for a motor vehicle provided with an embodiment of a protective device according to the invention.

A luggage area 1 for a car, in the present case for a station wagon or some similar vehicle with a large luggage area, is positioned in a tail region of the car and is bounded in the forward direction towards the passenger compartment 2 by a rear seat back arrangement 3. Bounding towards the sides takes place by in each case a vehicle side wall 4. Towards the rear the luggage area 1 is bounded by a not shown tailgate. The luggage area can be secured by a protective device. In the present case the protective device has a magazine casing 5, which is preferably detachably fixed either directly to the rear seat back arrangement 3 or to the side walls 4. In not shown manner, a first functional shaft 6a is mounted in rotary manner in the magazine casing 5 and is constructed in the present embodiment as a winding shaft on which is held in wind-on and wind-off manner a first surface structural portion 7a of a flat article 7. The first surface structural portion 7a is in the present case constructed as an at least substantially light-proof and therefore view-tight film web. The first functional shaft 6a is subject to a force in the winding-on direction of the flat article 7 by drive means 20 in the form of a return arrangement, here in the form of a return spring. The flat article 7 can be extracted from the magazine casing 5 by a not shown slot therein. In the longitudinal direction the first surface structural portion 7a is connected to a second surface structural portion 7b of the flat article 7. The concept of interconnecting the two surface structural portions 7a, 7b also covers an integral connection and implementation of the two surface structural portions 7a, 7b in a common flat article. The second surface structural portion 7b is held in wind-on and wind-off manner on a second functional shaft 6b in the form of a winding shaft. The second surface structural portion 7b is constructed as a light-transmitting netting and is consequently at least largely transparent. The magazine casing extends over virtually the entire width of the luggage area 1. Correspondingly the flat article 7 extends virtually over the entire width of the luggage area 1. In a compact, deposited rest position (FIG. 3a) the first surface structural portion 7a of the flat article 7 is wound completely onto the first functional shaft 6a and the second surface structural portion 7b of the flat article 7 completely onto the second functional shaft 6b. The flat article 7 is movably mounted between the rest position (FIG.

3a) and a first, roughly horizontally extracted protection position (FIG. 3b) in which the luggage area 1 is roughly horizontally covered, and a second, roughly vertically extracted protection position (FIG. 3c) in which the flat article 7 is fixed roughly vertically towards the motor vehicle roof lining.

During the extraction movement of the flat article between the first protection position and the second protection position, the facing front ends of the second functional shaft 6b are held in a linear guide arrangement 8 formed by two guide rails on each vehicle side. On the front ends of the second functional shaft 6b is in each case provided a toothed gear 9, which engages with in each case one first area of the guide rails in the form of a rack 8a. This area forms a positive guide for the functional shaft, because the latter, in addition to its longitudinal displacement movement, performs a rotary movement as a result of the meshing of the toothed gear 9, i.e. a pinion, with the rack 8a. During the linear movement of the second functional shaft 6b in this area of the guide rails the second functional shaft 6b consequently necessarily performs the superimposed rotary movement through which the second surface structural portion 7b of the flat article 7, as a function of the direction of the linear movement of the second functional shaft 6b, is wound from the latter or onto the latter. During a linear movement of the second functional shaft 6b from the first protection position into the second protection position, the second surface structural portion 7b is unwound from the second functional shaft 6b and during a movement from the second protection position into the first protection position, the second surface structural portion 7b is wound onto the second functional shaft 6b. The length L of the positive guide and therefore the rack 8a is dependent on the necessary length of the second surface structural portion 7b required for bridging the distance from the magazine casing 5 to the roof lining. The positive guide ensures that the second surface structural portion is virtually completely unwound from or wound onto the second functional shaft 6b.

When the second functional shaft 6b reaches the end of the rack 8a during the linear movement in the direction of the second protection position, it is no longer rotatable in the guide rails 8 and is instead only linearly guided until the second protection position is reached. To prevent a rotary movement outside the positively guided area, corresponding, not shown blocking means are located on the second functional shaft and prevent a rotary movement outside the positively guided area. As a result of the force exerted by the return arrangement of the first functional shaft 6a on the flat article 7, throughout the linear movement the latter is kept taut. The position determining means and means for controlling the second functional shaft 6b are implemented in the embodiment described by the positive guide 8a and the length thereof, as well as by the toothed gears 9 located on the second functional shaft 6b. The means for controlling the first functional shaft 6a are implemented by the described return arrangement.

Figure 3A:
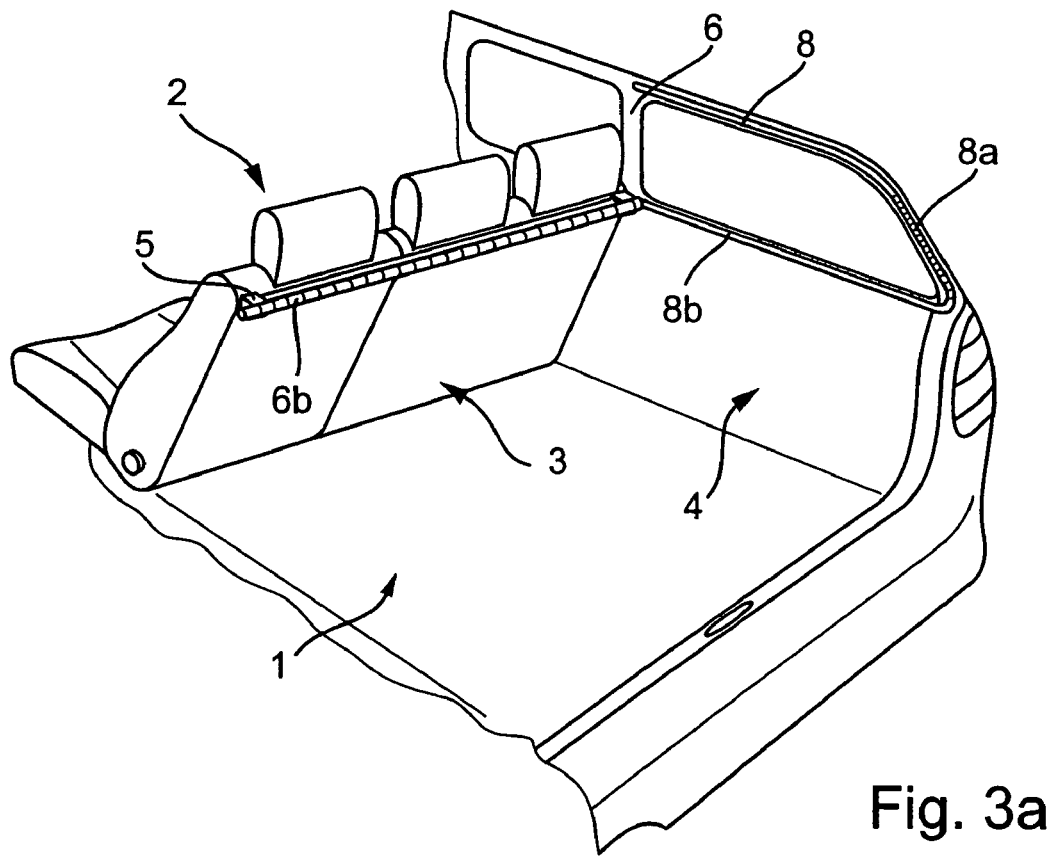
FIG. 3a perspectively shows a first protection position of the flat article in the luggage area of FIG. 1.
Figure 3B:
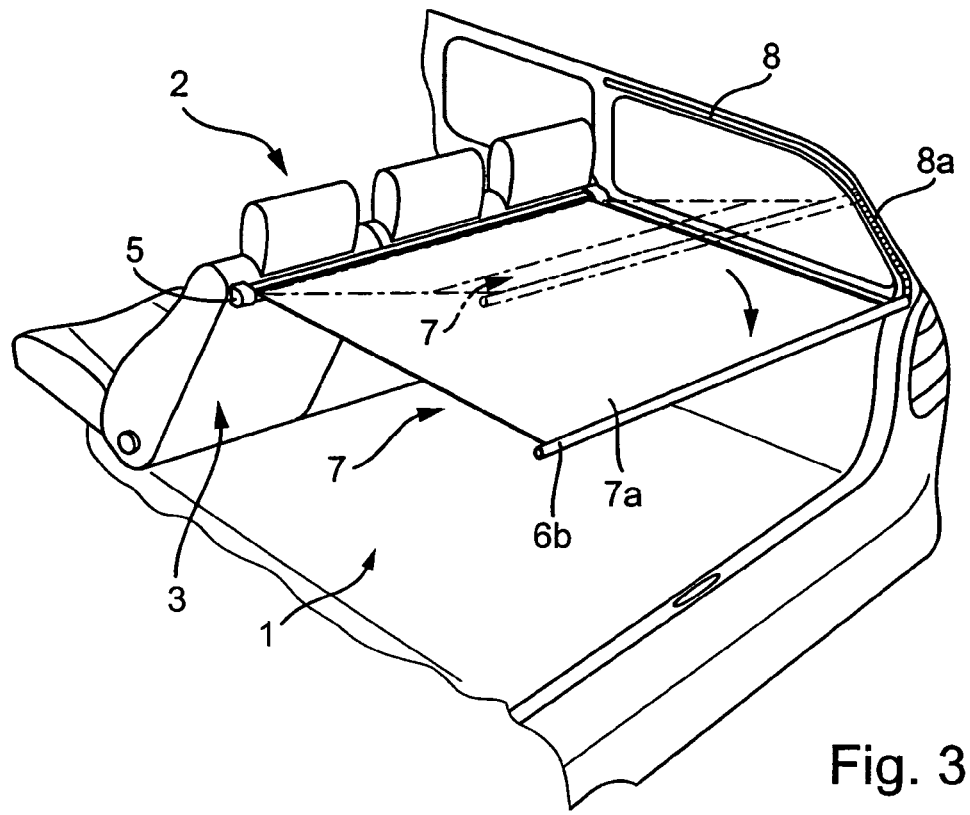
FIG. 3b perspectively shows a second protection position of the flat article in the luggage area of FIG. 1.

Additionally and as can be seen from FIGS. 3a and 3b, the second functional shaft 6b is also not rotatable between the rest position and the first protection position and is linearly guided in corresponding linear guides 8b on both vehicle sides.

As a function of whether an opaque surface structural portion 7a for the function of the horizontal luggage area cover or a transparent surface structural portion 7b for the function of the vertical partition is to be created, the functional shafts 6a and 6b can be driven in such a way as to fix the transparent surface structural portion 7b or the opaque surface structural portion 7a and wind up the in each case other surface structural portion 7a, 7b. Preferably, an electrical drive mechanism or actuator 21 controlled by an electronic control unit or control means 17 is associated with at least the second functional shaft 6b. For the end regions of the linear guide arrangements 8, which define the vertical and horizontal, first and second protection positions, electrical or electronic sensor or detecting means 18 are provided, which also detect the horizontal or vertical protection positions along the linear guide arrangement 9 taken up by the second functional shaft 6b and can transmit corresponding position signals to the control unit 17.

Figure 2:
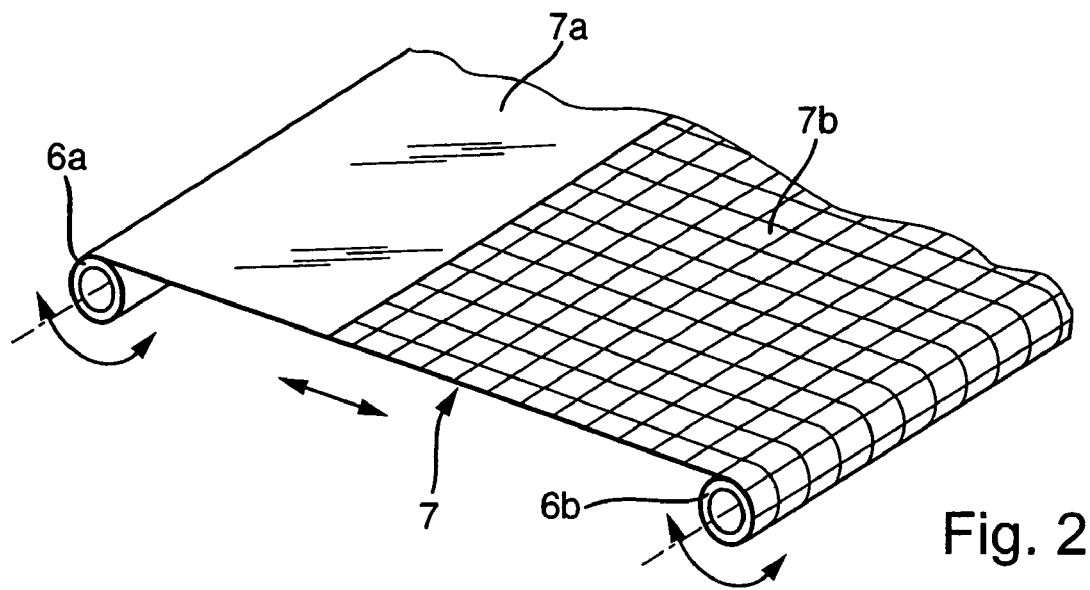
FIG. 2 is a perspective view of the flat article of the protective device of FIG. 1.

FIG. 2 shows the basic structure of the flat article 7 with the two functional shafts 6a and 6b. As is apparent from FIG. 2, the flat article 7 comprises two surface structural portions 7a and 7b placed on one another in the longitudinal direction, the surface structural portion 7a being constructed as a view-tight film web and the surface structural portion 7b as a transparent netting. The first surface structural portion 7a can be wound on or off the first functional shaft 6a and the second surface structural portion can be wound on or off the second functional shaft 6b. As stated, the corresponding rotary movements are released or activated as a function of detected positions, e.g. by a control unit.

FIG. 3a shows the protective device in the compact, deposited rest position, where the first surface structural portion 7a of the flat article 7 is completely wound onto the first functional shaft 6a and is released for an extraction movement, i.e. for a rotary movement. The second surface structural portion 7b of the flat article 7 is wound completely onto the second functional shaft 6b, which is released for a linear movement in the direction of the first protection position and is blocked against a rotary movement. In the rest position, the second functional shaft 6b engages on the slot of the magazine casing 5.

FIG. 3b shows the protective device in the first, horizontally extracted protection position, where the first surface structural portion 7a of the flat article 7 is completely unwound from the first functional shaft 6a and is released for a drawing in movement, i.e. for a rotary movement. The second surface structural portion 7b of the flat article 7 is completely wound onto the second functional shaft 6b, which is released for a linear movement in the direction of the second protection position and for a rotary movement.

Figure 3C:
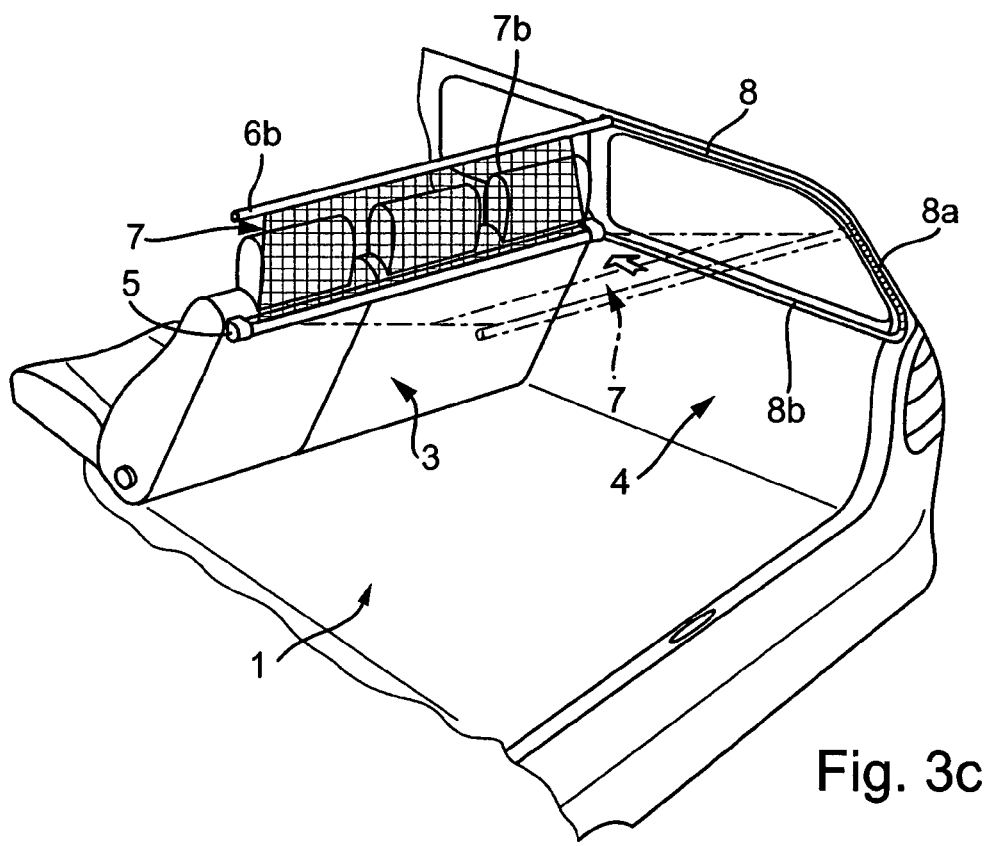
FIG. 3c perspective shows a third protection position of the flat article in the luggage area of FIG. 1.

FIG. 3c shows the protective device in the second, vertically extracted protection position, where the first surface structural portion 7a of the flat article 7 is wound completely onto the first functional shaft 6a and is released for an extraction movement, i.e. for a rotary movement. The second surface structural portion 7b of the flat article 7 is completely unwound from the second functional shaft 6b, which is released for a linear movement in the direction of the first protection position and blocked against a rotary movement.

The flat article 7 shown in broken line form in FIG. 3b illustrates an intermediate position of the flat article 7 during a linear movement of the second functional shaft 6b from the second into the first protection position, where the first surface structural portion 7a is partly unwound again from the first functional shaft and the second surface structural portion 7b is partly wound again onto the second functional shaft 6b.

The flat article 7 shown in broken line form in FIG. 3c illustrates an intermediate position of the flat article 7 during a linear movement of the second functional shaft 6b from the first to the second protection position, where the first surface structural portion 7a is again partly wound onto the first functional shaft and the second surface structural portion 7b is partly unwound from the second functional shaft 6b.

In the embodiment according to FIGS. 4a to 4c and 5a to 5c a flat article 12 having several connecting together surface structural portions 12a to 12c is fixed with a first end region 15 at the rear in the unwinding direction to a winding shaft 11. The winding shaft 11 is oriented in the vehicle transverse direction and movably mounted in a magazine housing 10. In the winding on direction (clockwise in the representation according to FIGS. 4a to 4c), the winding shaft 11 is subject to the action of the return spring recited in the embodiment according to FIG. 1, which keeps the flat article 12 in the tensioned state in its protection position.

A second end region 16 of the flat article 12 at the front in the unwinding direction is fixed to an outside of the magazine housing 10. The magazine housing 10 is vehicle-fixed in the interior of the motor vehicle and is held there more particularly in a luggage area. The flat article 12 is deflected by approximately 180.o slashed. about a guide profile 13, which is held in parallel displaceable manner in guide profilings 14 on facing vehicle side walls with respect to the winding shaft 11. In the embodiment shown, the guide profile 13 is cylindrical and is displaceably guided along the guide profilings 14 with its facing front ends. The guide profile is either held in displaceable manner in the guide profilings 14, or in much the same way as in the embodiment according to FIG. 1 is rollable with the aid of pinions and rack guides. The guide profilings 14 on facing vehicle side walls, starting from a border edge height extend on tail-side body columns in upwardly inclined and forward manner along the lateral roof frame. The spacing of the guide profile 13 relative to the winding shaft 11 changes over the movement of the guide profile 13 along the guide profilings 14. During this spatial displacement movement of the guide profile 13 the flat article 12 is held taut in that the return spring urges the winding shaft in the winding up direction and consequently places the flat article 12 under a permanent tensile load.

The flat article 12 has three surface structural portions 12a to 12c, the surface structural portion 12a admittedly having a limited light transmission. Surface structural portions 12b and 12c have a much higher light transmission compared therewith, because in the roughly vertical protection position of the flat article 12 according to FIGS. 4c and 5c they are intended to allow a view from a passenger compartment to a tail region of the motor vehicle.

Figure 4A:
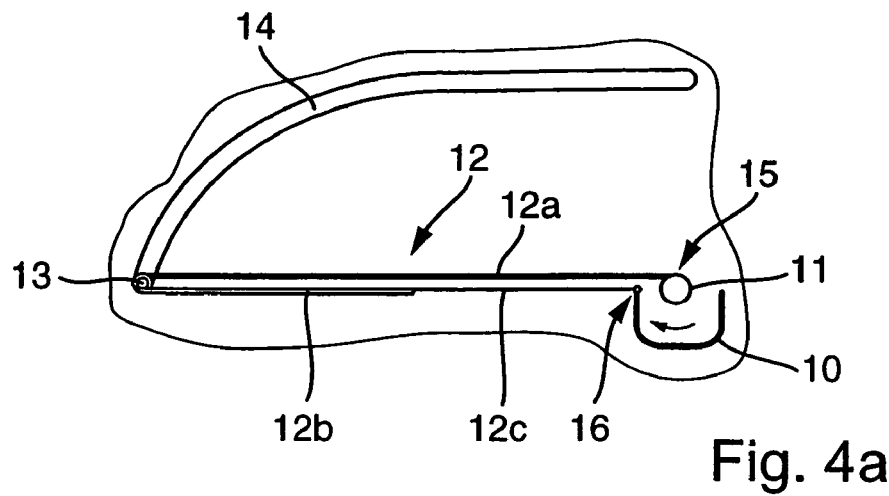
FIGS. 4a to c another embodiment of a protective device according to the invention in different protection positions.
Figure 4B:
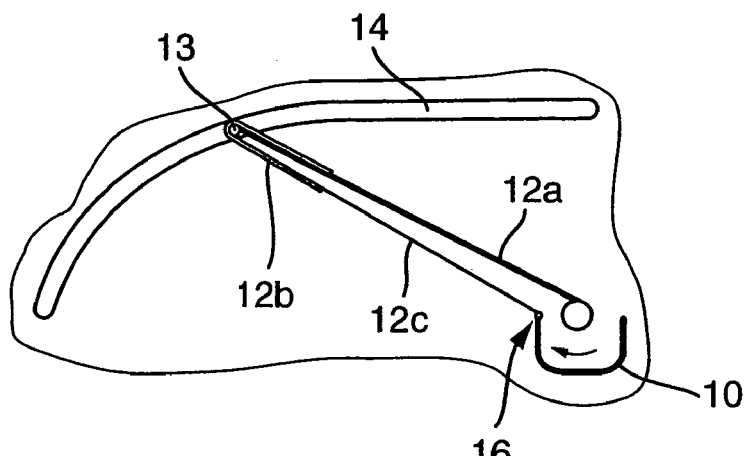
Figure 4C:
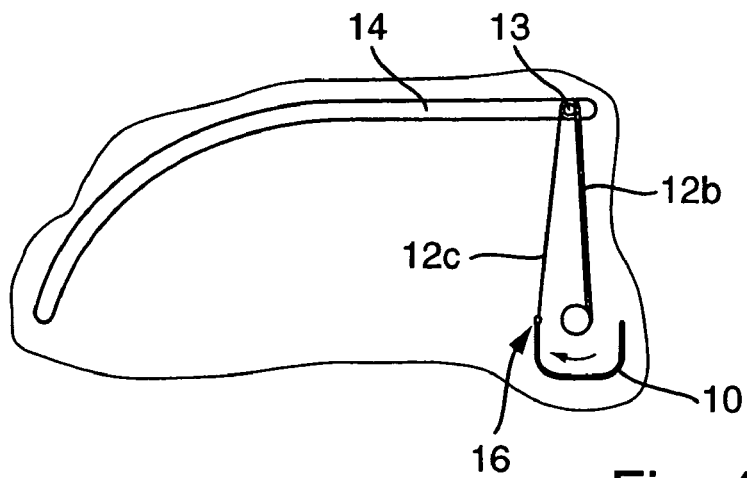
Figure 5A:
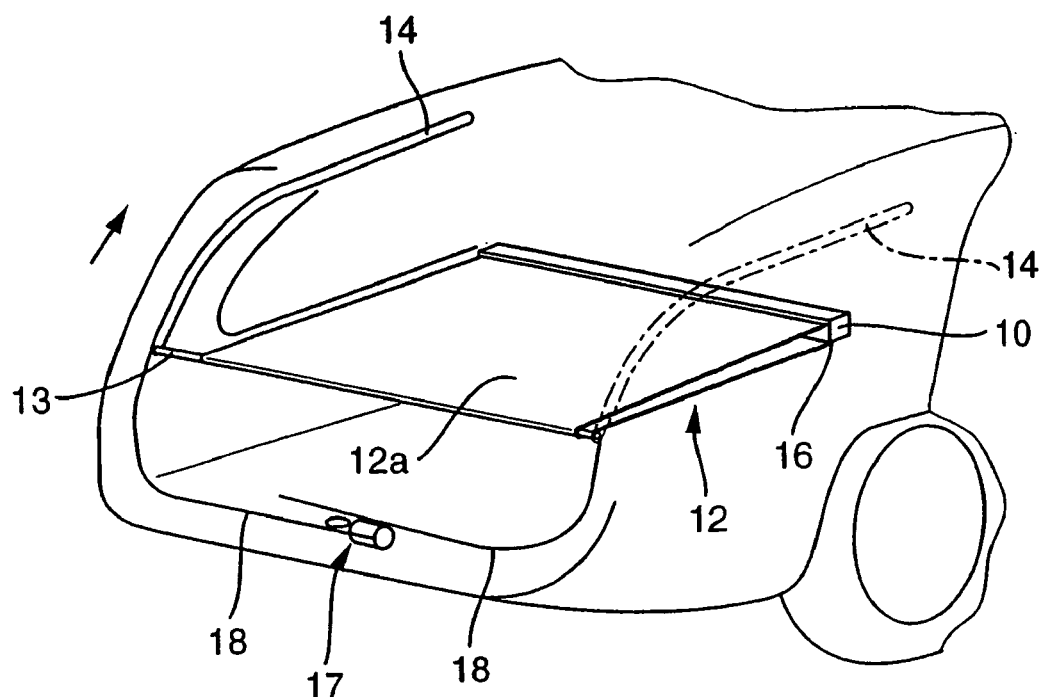
FIGS. 5a to c the embodiment according to FIGS. 4a to c, but in a perspective view.
Figure 5B:
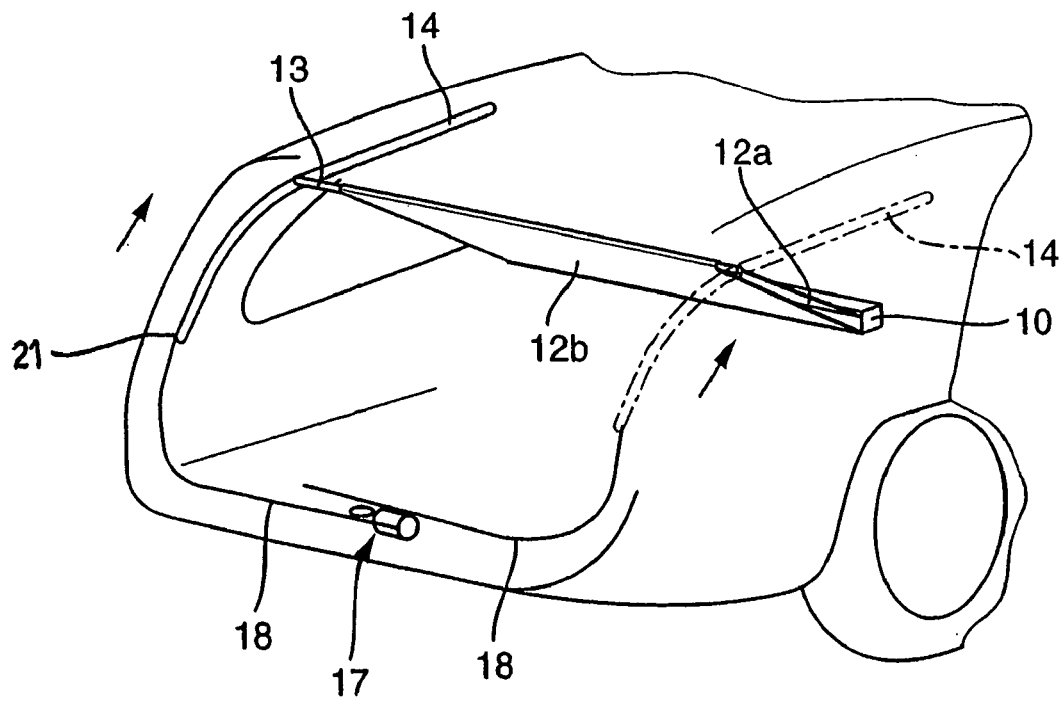
Figure 5C:
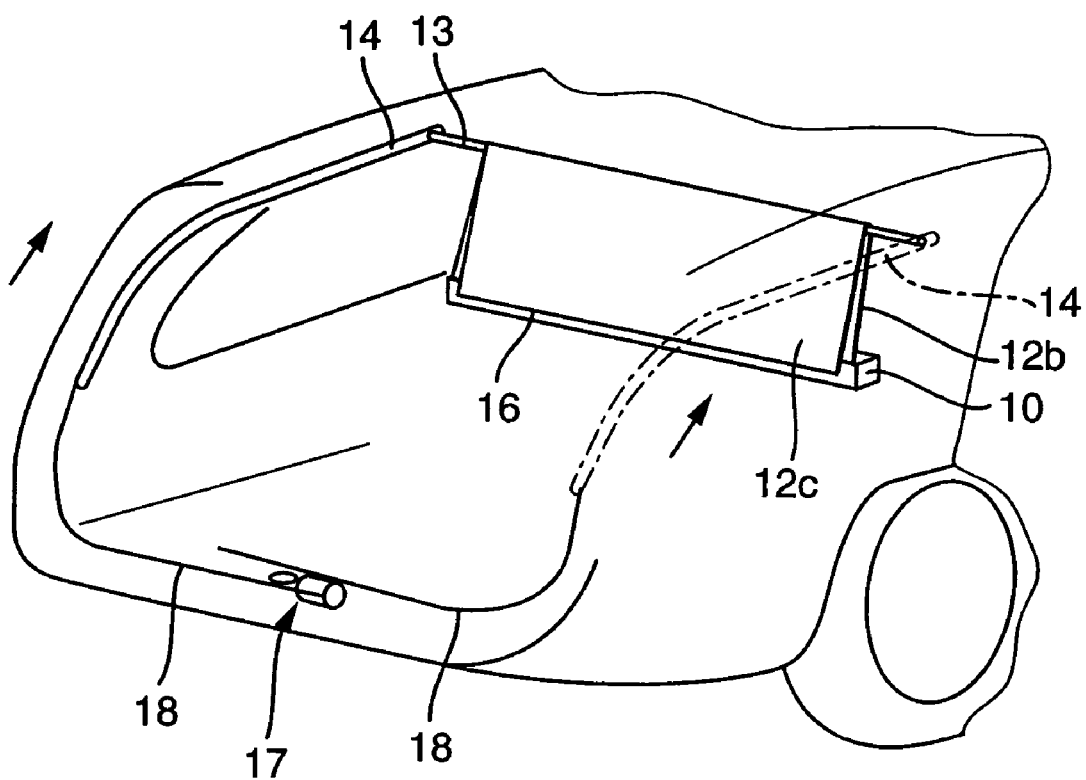

The surface structural portion 12a has a length matched to the horizontal extension of the luggage area section to be covered, as can be gathered from FIGS. 4a and 5a. Surface structural portions 12b and 12c are at least largely of the same length, which is in each case matched to a height extension of the luggage area section between the magazine housing 10 and a roof lining in order to permit a covering of this upwardly directed luggage area section in the roughly vertical protection position of the flat article.

The guide profile 13 is detachably held in the guide profilings 14, so that when necessary the flat article can be rolled at least substantially completely onto the winding shaft 11. If the guide profile according to FIGS. 4a and 5a is located on a tail-side, lower end of the guide profilings 14, the flat article 12 is in its roughly horizontally spread out protection position in which it forms a luggage area cover. In this protection position the surface structural portion 12a extends between the winding shaft 11 and the guide profile 13 and forms the surface of the flat article 12. Below the surface structural portion 12a the surface structural portions 12b and 12c run roughly parallel back to the magazine housing 10. As soon as the guide profile 13 is moved upwards and forwards along the guide profilings 14, the flat article 12 is carried along and the surface structural portion 12a is necessarily wound onto the winding shaft 11. In the roughly vertical protection position (FIGS. 4c and 5c), the surface structural portion 12a is wound completely onto the winding shaft 11, so that the surface structural portion 12b extends between the winding shaft 11 and the guide profile 13 positioned above the magazine housing 10. In this position there is a connecting seam between the surface structural portion 12b and the connecting surface structural portion 12c roughly on the outer jacket of the guide profile 13. The surface structural portion 12c extends at least largely parallel to the surface structural portion 12b in the downwards direction and is fixed to the magazine housing 10.

A correspondingly reversed displacement movement of the guide profile 13 back into the roughly horizontal protection position leads to a removal and unwinding of the surface structural portion 12a from the winding shaft 11, in that the guide profile 13 is moved rearwards and downwards counter to the return force of the return spring of winding shaft 11.

The invention claimed is:

1. A protective device for a luggage area of a motor vehicle with a flexible flat article movably mounted between a compact, deposited rest position and at least one extracted protection position, wherein there are at least two surface structural portions exhibiting different light transmission that are connected to one another and which form part of the flat article, a first end region of the flat article is fixed to a vehicle-fixed, rotatably mounted winding shaft, the flat article being guided on a movably mounted guide profile parallel to the winding shaft in the luggage area and a second opposing end region of the flat article is fixed to a vehicle-fixed component adjacent to the winding shaft.

2. The protective device according to claim 1, wherein the lengths of the surface structural portions are matched to the dimensions of the luggage area to be covered.

* * * * *